(12) United States Patent
Gheorghiu et al.

(10) Patent No.: US 9,927,841 B2
(45) Date of Patent: Mar. 27, 2018

(54) APPARATUS AND METHOD OF PROVIDING AN APPARATUS COMPRISING A BENDABLE PORTION

(71) Applicant: Nokia Technologies Oy, Espoo (FI)

(72) Inventors: Catalin Gheorghiu, Helsinki (FI); Esa-Sakari Määttä, Espoo (FI); Ilpo Kauhaniemi, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/100,760

(22) PCT Filed: Nov. 26, 2014

(86) PCT No.: PCT/FI2014/050908
§ 371 (c)(1),
(2) Date: Jun. 1, 2016

(87) PCT Pub. No.: WO2015/086890
PCT Pub. Date: Jun. 18, 2015

(65) Prior Publication Data
US 2016/0299532 A1 Oct. 13, 2016

(30) Foreign Application Priority Data

Dec. 10, 2013 (GB) .................................. 1321832.6

(51) Int. Cl.
*G06F 1/16* (2006.01)
*H04M 1/02* (2006.01)
(Continued)

(52) U.S. Cl.
CPC ............. *G06F 1/1652* (2013.01); *E05D 1/00* (2013.01); *E05D 11/0054* (2013.01);
(Continued)

(58) Field of Classification Search
CPC ...... G06F 1/1652; G06F 1/181; G06F 1/1681; H04B 1/3888; E05D 1/00; E05D 11/0054;
(Continued)

(56) References Cited

U.S. PATENT DOCUMENTS 5,631,053 A 5/1997 Andersen et al.
8,379,378 B2 2/2013 Visser et al.
(Continued)

FOREIGN PATENT DOCUMENTS

EP 2728432 7/2014
JP 2002111823 4/2002
(Continued)

OTHER PUBLICATIONS

International Search Report and Written Opinion received for corresponding Patent Cooperation Treaty Application No. PCT/FI2014/050908, dated Feb. 18, 2015, 10 pages.
(Continued)

*Primary Examiner* — Dimary Lopez Cruz
*Assistant Examiner* — Abhishek Rathod
(74) *Attorney, Agent, or Firm* — Alston & Bird LLP

(57) ABSTRACT

An apparatus and method wherein the apparatus comprises: a substrate wherein the substrate is configured to support a flexible display and the substrate comprises at least one bendable portion configured to enable the substrate to be moved between an open configuration and a closed configuration and wherein the at least one bendable portion comprises a plurality of rigid members; and a bendable cover portion configured to cover at least the bendable portion of the substrate wherein the bendable cover portion comprises a plurality of foldable portions configured to be folded between the rigid members such that the foldable portions
(Continued)

enable the bendable cover portion to be moved between an open configuration and a closed configuration.

17 Claims, 15 Drawing Sheets

(51) Int. Cl.
  *E05D 1/00* (2006.01)
  *E05D 11/00* (2006.01)
  *G06F 1/18* (2006.01)
  *H04B 1/3888* (2015.01)
  *E05D 1/02* (2006.01)

(52) U.S. Cl.
  CPC ............ *G06F 1/1681* (2013.01); *G06F 1/181* (2013.01); *H04B 1/3888* (2013.01); *H04M 1/0216* (2013.01); *E05D 1/02* (2013.01); *E05D 2011/0072* (2013.01); *E05Y 2900/606* (2013.01); *H04M 1/0268* (2013.01)

(58) Field of Classification Search
  CPC ............ E05D 2011/0072; E05D 1/02; H04M 1/0216; H04M 1/0268; E05Y 2900/606
  See application file for complete search history.

(56) References Cited

U.S. PATENT DOCUMENTS

| | | |
|---|---|---|
| 2002/0067339 A1 | 6/2002 | Min |
| 2007/0117600 A1* | 5/2007 | Robertson, Jr. ...... H04M 1/0216 455/575.3 |
| 2009/0126155 A1* | 5/2009 | Nieuwenhuizen .. H04M 1/0216 16/302 |
| 2010/0232100 A1 | 9/2010 | Fukuma et al. |
| 2012/0110784 A1 | 5/2012 | Hsu et al. |
| 2012/0126133 A1* | 5/2012 | Bengtsson ............... G01T 1/026 250/370.09 |
| 2012/0212433 A1 | 8/2012 | Lee et al. |
| 2012/0307472 A1 | 12/2012 | Bohn et al. |
| 2013/0216740 A1* | 8/2013 | Russell-Clarke ...... B23K 26/38 428/33 |
| 2013/0219663 A1 | 8/2013 | Cai |
| 2014/0126133 A1* | 5/2014 | Griffin .................. G06F 1/1652 361/679.27 |
| 2014/0217875 A1* | 8/2014 | Park ..................... H05K 5/0226 312/326 |

FOREIGN PATENT DOCUMENTS

| | | |
|---|---|---|
| JP | 2008228249 | 3/2007 |
| KR | 10-103307 | 5/2011 |
| WO | 2009064965 | 5/2009 |
| WO | 2012167204 | 12/2012 |

OTHER PUBLICATIONS

Search Report received for corresponding GB Application No. 1321832.6, dated Jun. 23, 2014, 4 pages.

Darren Murph. "Conceptual Flexi PDA boasts rubber hinges, flexible display." [retrieved Sep. 5, 2013]. Rtrieved from the Internet: <URL: http:engadget.com/2007/05/16/conceptual-flexi-pda-boasts-rubber-hinges-flexible-display/>. (dated May 16, 2007) 2 pages.

* cited by examiner

APPARATUS AND METHOD OF PROVIDING AN APPARATUS COMPRISING A BENDABLE PORTION

RELATED APPLICATION

This application was originally filed as PCT Application No. PCT/FI2014/050908 filed Nov. 26, 2014, which claims priority benefit from GB Application No. 1321832.6, filed Dec. 10, 2013.

TECHNOLOGICAL FIELD

Examples of the present disclosure relate to an apparatus and method of providing an apparatus comprising a bendable portion. In particular, they relate to an apparatus and method of providing an apparatus comprising a bendable portion in which a bendable cover portion may be provided to cover at least the bendable portion of the apparatus.

BACKGROUND

Apparatus comprising bendable portions are known. Such apparatus may comprise electronic components such as displays. It is useful to provide covers for such apparatus to protect electronic components within the apparatus.

BRIEF SUMMARY

According to various, but not necessarily all examples of the disclosure, there may be provided an apparatus comprising: a substrate wherein the substrate is configured to support a flexible display and the substrate comprises at least one bendable portion configured to enable the substrate to be moved between an open configuration and a closed configuration and wherein the at least one bendable portion comprises a plurality of rigid members; and a bendable cover portion configured to cover at least the bendable portion of the substrate wherein the bendable cover portion comprises a plurality of foldable portions configured to be folded between the rigid members such that the foldable portions enable the bendable cover portion to be moved between an open configuration and a closed configuration.

In some examples the bendable cover portion may comprise a plurality of fixed portions configured to be fixed to a plurality of the rigid members. The rigid members may comprise projections configured to enable the fixed portions of the bendable cover portion to be fixed to the substrate. The foldable portions may be provided between fixed portions.

In some examples the foldable portions may be configured to, at least partially, unfold as the apparatus is moved from an open to a closed position.

In some examples the bendable cover portion may be fixed to the substrate using an adhesive.

In some examples the rigid members may extend horizontally across the apparatus.

In some examples the rigid members may be coupled together by at least one linking member.

In some examples the flexible display may be continuous across the bendable portion.

In some examples the apparatus may be configured so that when the apparatus is in the closed configuration a first portion of the display and a second portion of the display are configured facing each other.

In some examples the bendable cover portion may form at least part of the external casing of the apparatus.

In some examples the bendable cover portion may be configured to protect electronic components within the apparatus.

In some examples the substrate may comprise rigid portions and the apparatus may comprise rigid cover portions configured to cover at least part of the rigid portions of the substrate.

In some examples the bendable cover portion may comprise a rear face configured to cover at least a portion of a rear face of the substrate and the bendable cover portion also comprises at least one side face configured to cover at least one side face of the substrate.

According to various, but not necessarily all examples of the disclosure, there may be provided a bendable cover portion configured to cover at least a bendable portion of an apparatus wherein the bendable cover portion comprises a plurality of foldable portions configured to be folded between rigid members of the apparatus such that the foldable portions enable the bendable cover portion to be moved between an open configuration and a closed configuration.

In some examples the bendable cover portion may comprise a plurality of fixed portions configured to be fixed to a plurality of the rigid members. The foldable portions may be configured to be provided between fixed portions. The foldable portions may be configured to, at least partially, unfold as the bendable cover portion is moved from an open to a closed position.

According to various, but not necessarily all examples of the disclosure, there may be provided a method comprising: providing a substrate wherein the substrate is configured to support a flexible display and the substrate comprises at least one bendable portion configured to enable the substrate to be moved between an open configuration and a closed configuration and wherein the at least one bendable portion comprises a plurality of rigid members; and providing a bendable cover portion configured to cover at least the bendable portion of the substrate wherein the bendable cover portion comprises a plurality of foldable portions configured to be folded between the rigid members such that the foldable portions enable the bendable cover portion to be moved between an open configuration and a closed configuration.

In some examples the bendable cover portion may comprise a plurality of fixed portions configured to be fixed to a plurality of the rigid members. The rigid members may comprise projections configured to enable the fixed portions of the bendable cover portion to be fixed to the substrate. The foldable portions may be provided between the fixed portions.

In some examples the foldable portions may be configured to, at least partially, unfold as the apparatus is moved from an open to a closed position.

In some examples the method may further comprise fixing the bendable cover portion to the substrate using an adhesive.

In some examples the rigid members may extend horizontally across the apparatus.

In some examples the method may further comprise providing at least one linking member to couple the rigid members together.

In some examples the flexible display may be continuous across the bendable portion.

In some examples when the apparatus is in the closed configuration a first portion of the display and a second portion of the display may be configured facing each other.

In some examples the bendable cover portion may form at least part of the external casing of the apparatus.

In some examples the bendable cover portion may be configured to protect electronic components within the apparatus.

In some examples the substrate may comprise rigid portions and the apparatus comprises rigid cover portions configured to cover at least part of the rigid portions of the substrate.

In some examples the bendable cover portion may comprise a rear face configured to cover at least a portion of a rear face of the substrate and the bendable cover portion also comprises at least one side face configured to cover at least one side face of the substrate.

The apparatus may be an apparatus such as a communications apparatus or a gaming apparatus which may enable wireless communication.

BRIEF DESCRIPTION

For a better understanding of various examples that are useful for understanding the detailed description, reference will now be made by way of example only to the accompanying drawings in which.

DETAILED DESCRIPTION

Figure 1A:
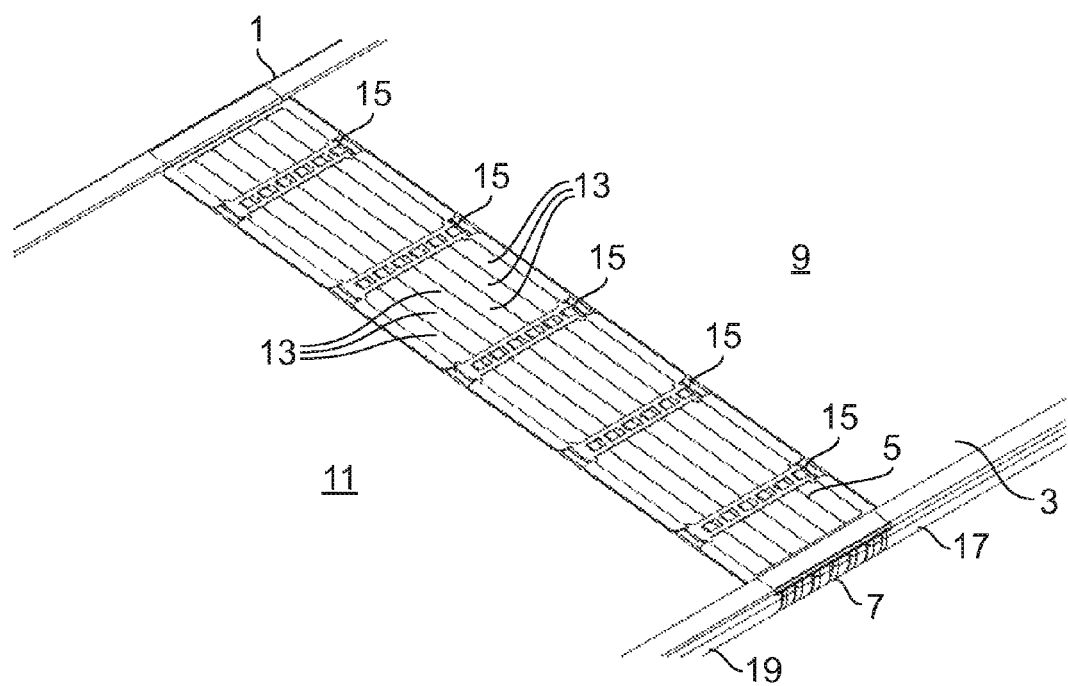
FIGS. 1A to 1C illustrate an apparatus.

The Figures illustrate an apparatus 1 comprising; a substrate 3 wherein the substrate 3 is configured to support a flexible display and the substrate 3 comprises at least one bendable portion 5 configured to enable the substrate 3 to be moved between an open configuration and a closed configuration and wherein the at least one bendable portion 5 comprises a plurality of rigid members 13; and a bendable cover portion 7 configured to cover at least the bendable portion 5 of the substrate 3 wherein the bendable cover portion 7 comprises a plurality of foldable portions 29 configured to be folded between the rigid members 13 such that the foldable portions 29 enable the bendable cover portion 7 to be moved between an open configuration and a closed configuration.

Figure 1B:
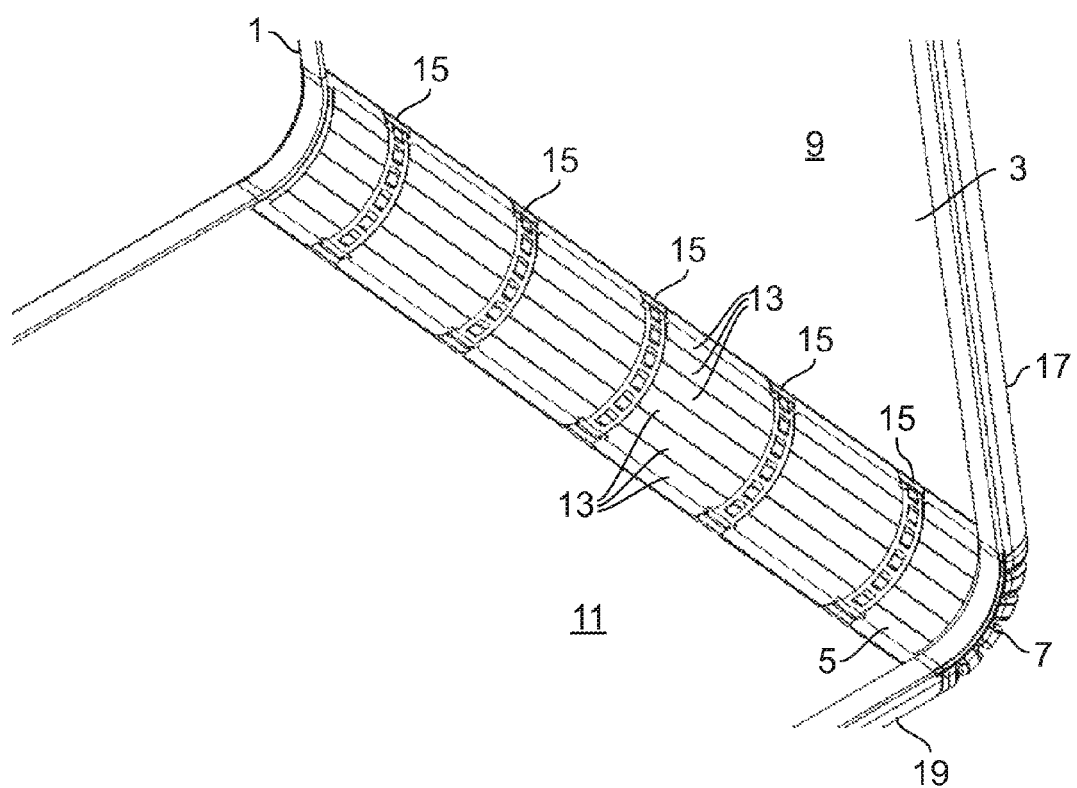
Figure 1C:
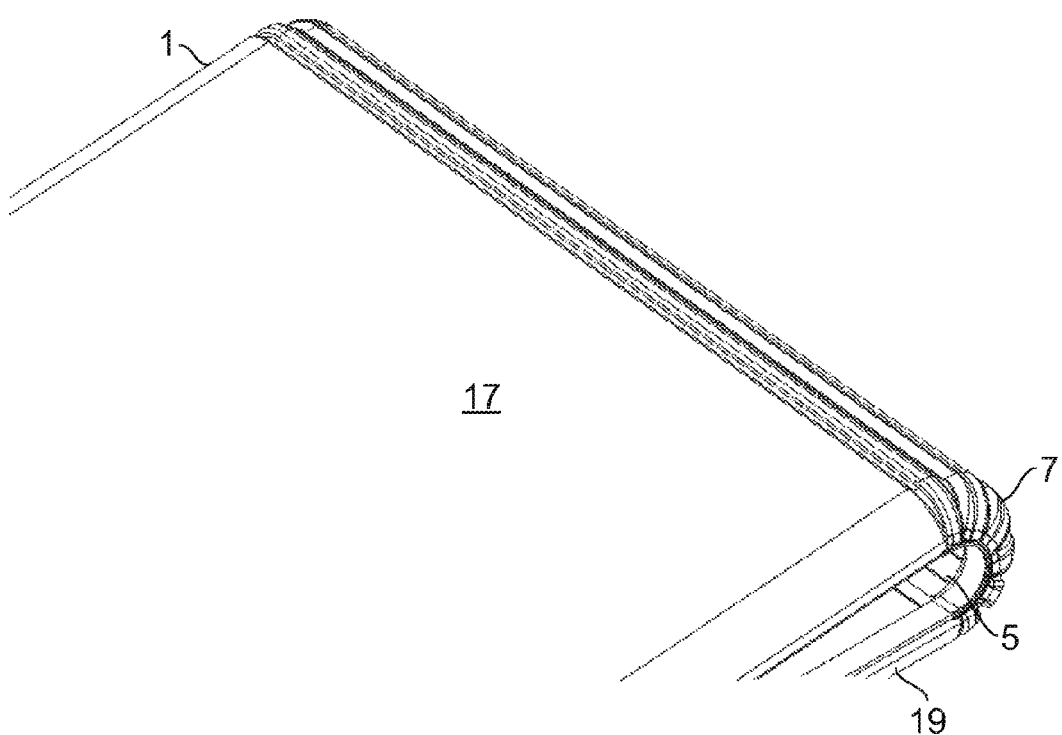

FIGS. 1A to 1C illustrate an apparatus 1 according to an example of the disclosure. The apparatus 1 comprises a substrate 3. The substrate 3 comprises at least one bendable portion 5. A bendable cover portion 7 is provided to cover at least some of the bendable portion 5.

The apparatus 1 may be a device such as an electronics communication device. The apparatus 1 may be configured for wireless communication. For example the apparatus 1 may be a mobile cellular telephone or a tablet computer or any other device which may be connected to a wireless network to enable the apparatus 1 to send and receive data. The apparatus 1 may be configured to control a display to display information.

The apparatus 1 may be a handheld apparatus which a user may be able to carry in their hand. The apparatus 1 may be a configured so that a user can hold the apparatus 1 in their hand while they are using the apparatus 1.

The substrate 3 may provide a flat or substantially flat surface on which electronic components such as a display may be mounted. The display which may be mounted on the substrate 3 could be a flexible display. The flexible display may be continuous across the bendable portion 5 so that the display is configured to display information even in the regions overlying the bendable portion 5.

In the examples of FIGS. 1A to 1C the substrate 3 comprises a first region 9, a second region 11 and at least one bendable portion 5. The bendable portion 5 is provided between the two regions 9, 11. As illustrated in FIGS. 1A to 1C the first region 9 is provided on the right hand side of the bendable portion 5 and the second region 11 is provided on the left hand side of the bendable portion 5.

It is to be appreciated that only part of the regions 9, 11 are illustrated in FIGS. 1A to 1C. Each of the regions 9, 11 may be the same size or approximately the same size. In other examples the regions 9, 11 may be different sizes and/or shapes.

In some examples the regions 9, 11 of the substrate 3 on either side of the bendable portion 5 may be rigid or substantially rigid. The regions 9, 11 of the substrate 3 may be rigid so as to prevent electronic components, such as displays, which are mounted on the substrate 3 from being deformed by a user in any region of the apparatus 1 other than the bendable portion 5.

In the example of FIGS. 1A to 1C one bendable portion 5 is provided. The bendable portion is provided around the midpoint of the substrate 3. It is to be appreciated that in other examples the apparatus 1 may comprise more than one bendable portion 5. It is also to be appreciated that in other examples the bendable portion 5 may be provided in other positions of the substrate 3.

In the examples of FIGS. 1A to 1C the bendable portion 5 comprises a plurality of rigid members 13. The plurality of rigid members 13 may extend horizontally across the apparatus 1. The plurality of rigid members 13 may be configured to move relative to each other to enable the substrate 3 to be moved between an open and closed configuration.

The plurality of rigid members 13 may be made of any suitable material such as plastic. In some examples the plurality of rigid members and the regions 9, 11 of the substrate may all be made from the same material.

In the examples of FIGS. 1A to 1C a plurality of linking members 15 are provided. The linking members 15 provide means for linking the plurality of rigid members 13 together. In the examples of FIGS. 1A to 1C the linking members 15 are arranged across the rigid members 13 to couple the plurality of rigid members 13 together. In the example of FIGS. 1A to 1C a plurality of linking members 15 are provided spaced across the bendable portion 5. It is to be appreciated that other means for connecting the rigid members 13 together may be provided in other examples of the disclosure.

The apparatus 1 also comprises a cover. In the example of FIGS. 1A to 1C the cover comprises a bendable cover portion 7, a first rigid cover portion 17 and a second rigid cover portion 19. The bendable cover portion 7 may be provided to cover at least some of the bendable portion 5. The rigid cover portions 17, 19 may be arranged to cover at least some of the regions 9, 11 of the apparatus 1.

The cover portions 7, 17, 19 may provide at least part of an external housing for the apparatus 1. The cover portions 7, 17, 19 may be configured so that when the apparatus 1 is in use the user may be able to touch the cover portions 7, 17, 19. The cover portions 7, 17, 19 may provide protection for the components of the apparatus 1. For example, the cover portions 7, 17, 19 may protect electronic components of the apparatus 1 from atmospheric conditions such as moisture or temperature variations.

In some examples the cover portions 7, 17, 19 may also be configured to protect the components of the apparatus 1 from impacts or other applied forces.

The bendable cover portion 7 may be fixed to the substrate 3. The bendable cover portion 7 may be securely fixed to the substrate 3 to ensure that the bendable cover portion is not pulled away from the substrate 3 as the apparatus 1 is moved between the open and closed configurations. In some examples the bendable cover portion 7 may be fixed to the substrate 3 so that the bendable cover portion 7 cannot be easily removed by the user.

The bendable cover portion 7 may be fixed to the regions 9, 11 of the substrate 3 and/or one or more of the rigid members 13. The bendable cover portion 7 may be fixed to the regions 9, 11 of the substrate 3 and/or the rigid members 13 using any suitable means such as adhesive. In some examples the adhesive may be cured using ultra violet radiation. In some examples the bendable cover portion 7 could be fixed to the rigid members 17 by over molding the bendable cover portion 7 onto one or more of the rigid members 13.

The bendable cover portion 7 may be configured to bend as the apparatus 1 is moved between the open and closed configurations, as illustrated in FIGS. 1A to 1C. The bendable cover portion 7 may comprise a plurality of foldable portions. The foldable portions may be configured to be folded between the rigid members 13 of the bendable portion. The foldable portions may enable the bendable cover portion 7 to be moved between an open configuration and a closed configuration The bendable cover portion 7 may be made of any suitable material such as rubber or thermoplastic elastomer.

The rigid cover portions 17, 19 may be releasably attached to the substrate 3. The rigid cover portions 17, 19 may be releasably attached to the substrate so that one or more of the rigid cover portions 17, 19 can be easily removed by a user of the apparatus 1. For example the rigid cover portions 17, 19 may be attached to the rigid portions 9, 11 of the substrate 3 by a latch or sliding mechanism or any means which may enable a user to remove one or both of the rigid cover portions 17, 19.

The rigid cover portions 17, 19 may be made of any suitable material such as plastic, metal, a composite material or any combination of such materials.

In the example of FIGS. 1A to 1C the substrate 3 is configured to be moved between an open configuration and a closed configuration. In FIG. 1A the substrate 3 is configured in an open configuration. In the open configuration the two regions 9, 11 of the substrate 3 are arranged adjacent to each other so that the surface of the substrate 3 provides a continuous flat or substantially flat surface.

In FIG. 1B the substrate 3 is configured in a partially open configuration. In examples where a display is mounted on the substrate 3 the two regions 9, 11 may be arranged in a partially open configuration so that the two regions 9, 11 may be viewed simultaneously by a user. In the example of FIG. 1B the angle between the two regions 9, 11 is around 90°. It is to be appreciated that the apparatus 1 may be arranged in other partially open configurations with a different angle between the two regions 9, 11.

In FIG. 1C the substrate 3 is configured in a closed configuration. In the closed configuration the two regions 9, 11 of the substrate 3 overlay each other. In examples where a display is mounted on the substrate 3 the two regions 9, 11 may be arranged overlaying each other so that a first portion of the display and a second portion of the display are facing each other.

Apparatus 1 such as the example apparatus of FIGS. 1A to 1C provide a substrate 3 with a large surface area when it is the open configuration. This may increase the area available for electronic components such as displays. However the apparatus 1 can be folded when it is not in use which may make the apparatus 1 easier and more convenient for a user to carry.

Figure 2A:
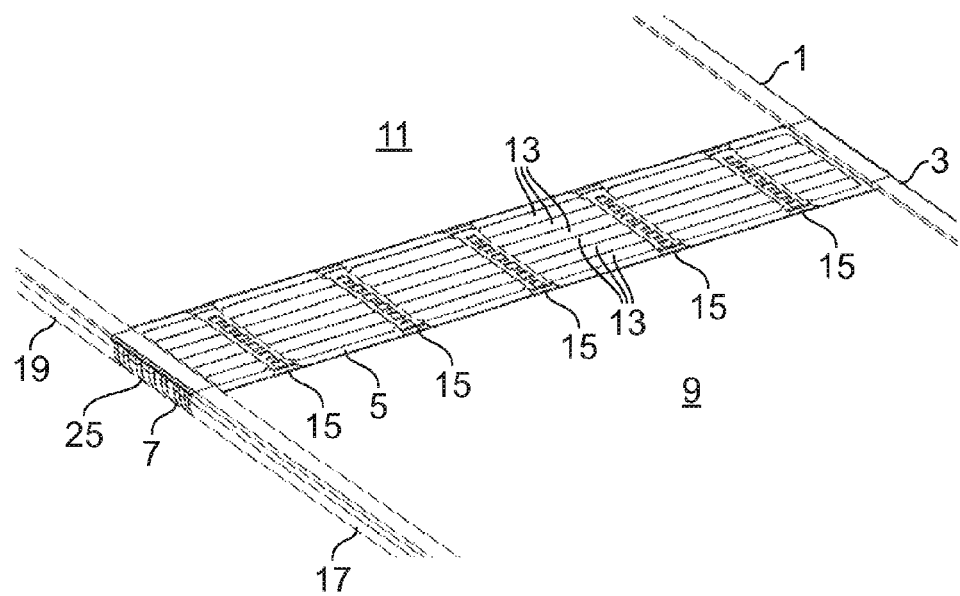
FIGS. 2A to 2C illustrate an apparatus.
Figure 2B:
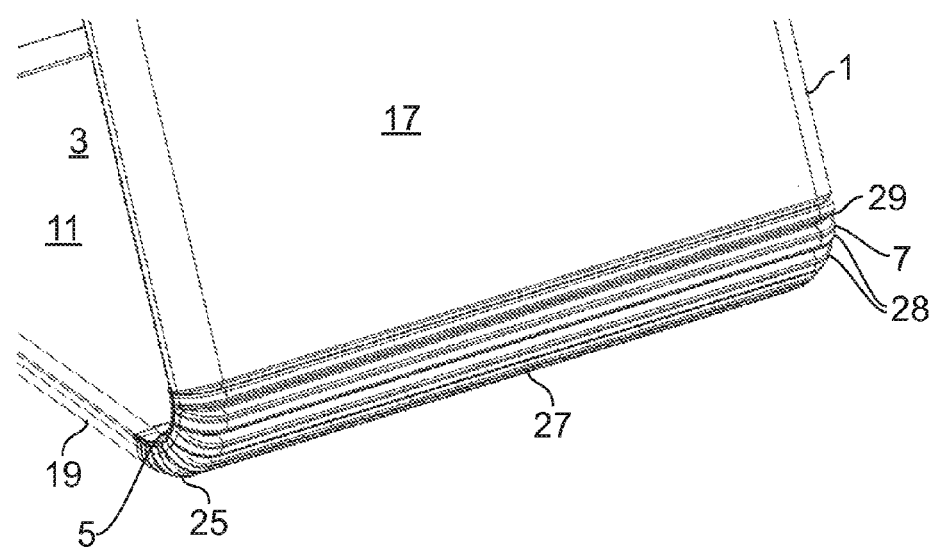
Figure 2C:
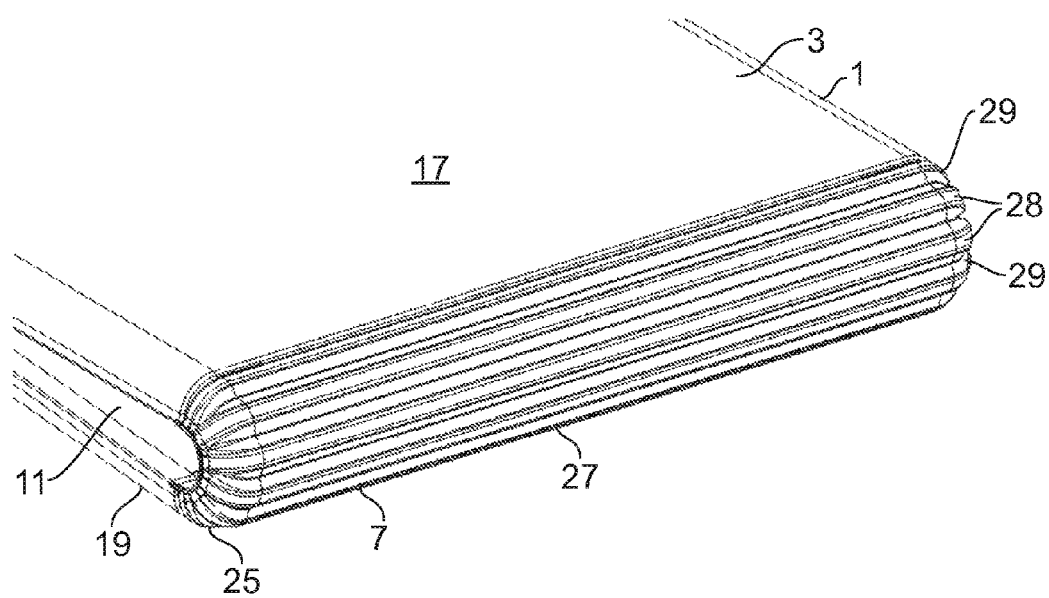

FIGS. 2A to 2C illustrate an apparatus 1 according to examples of the disclosure. The apparatus 1 may be as described above in relation to FIGS. 1A to 1C and so corresponding reference numerals are used for corresponding features.

FIGS. 2A to 2C illustrate the rear view of the apparatus 1 as it is moved between the open and closed configurations. In the example of FIG. 2A the apparatus 1 is illustrated in the open configuration, in the example of FIG. 2B the apparatus is illustrates in a partially open configuration and in the example of FIG. 2C the apparatus is illustrated in a closed configuration. The open, partially open and closed configurations may be as described above in relation to FIGS. 1A to 1C.

The bendable cover portion 7 comprises a rear face configured to cover at least a portion of a rear face of the substrate 3. In the example of FIG. 2A the apparatus 1 is illustrated in an open configuration so that the user can view the front face of the substrate 3. The rear face of the substrate 3 and the rear face of the bendable cover portion 7 are not in view in the configuration of FIG. 2A.

The bendable cover portion 7 may also comprise at least one side face 25 which may be configured to cover at least a portion of a side face of the substrate 3. In the example of FIG. 2A a side face 25 of the bendable cover portion 7 is illustrated on the left hand side of the apparatus 1. It is to be appreciated that a second side face 25 may also be provided on the opposite side of the apparatus 1 but that this is not in view in FIG. 2A.

In FIG. 2B the apparatus 1 is arranged in a partially open configuration. In the view of FIG. 2B the rear face 27 of the bendable cover portion 7 is in view. The bendable cover portion 7 comprises fixed portions 28 and foldable portions 29. In the example of FIGS. 2A to 2C a plurality of fixed portions a 28 and a plurality of foldable portions 29 are provided. The foldable portions 29 are provided between the fixed portions 28.

In the example of FIGS. 2A to 2C the plurality of fixed portions 28 are configured to be fixed to a plurality of the rigid members 13 of the substrate 3. In some examples the bendable cover portion 7 may also comprise portions which are configured to be fixed to the regions 9, 11 of the substrate 3.

In the examples of FIGS. 2A to 2C a foldable portion 29 is provided between each of the fixed portions 28. The foldable portions 29 may be configured to be folded between the rigid members 13 of the substrate 3. When the apparatus 1 is in the closed configuration the foldable portions 29 may be folded into a gap between the lower portions of the rigid members 13. As the apparatus 1 is moved into a partially open configuration the foldable portions 29 at least partially unfold.

In FIG. 2C the apparatus 1 is arranged in a closed configuration. In the view of FIG. 2C the rear face 27 of the bendable cover portion 7 is in view so that the fixed portions 28 and foldable portions 29 can be seen.

As the apparatus 1 has been moved from the partially open configuration of FIG. 2B to the closed configuration of FIG. 2C the foldable portions 29 have unfolded further. In the example FIG. 2C the foldable portions 29 are still partially folded even when the apparatus 1 is in the closed configuration.

Figure 3A:
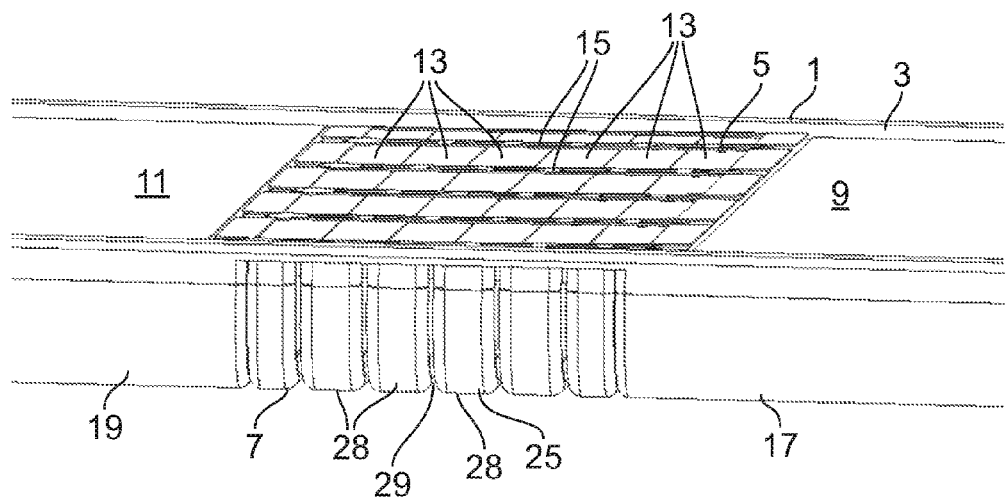
FIGS. 3A to 3C illustrate an apparatus.
Figure 3B:
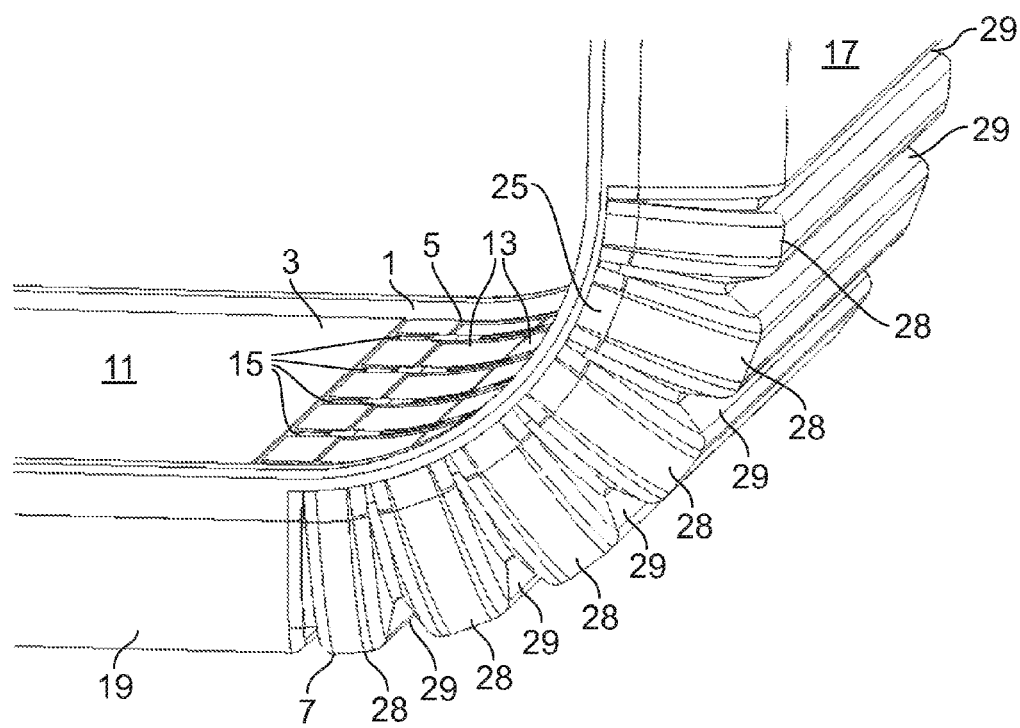
Figure 3C:
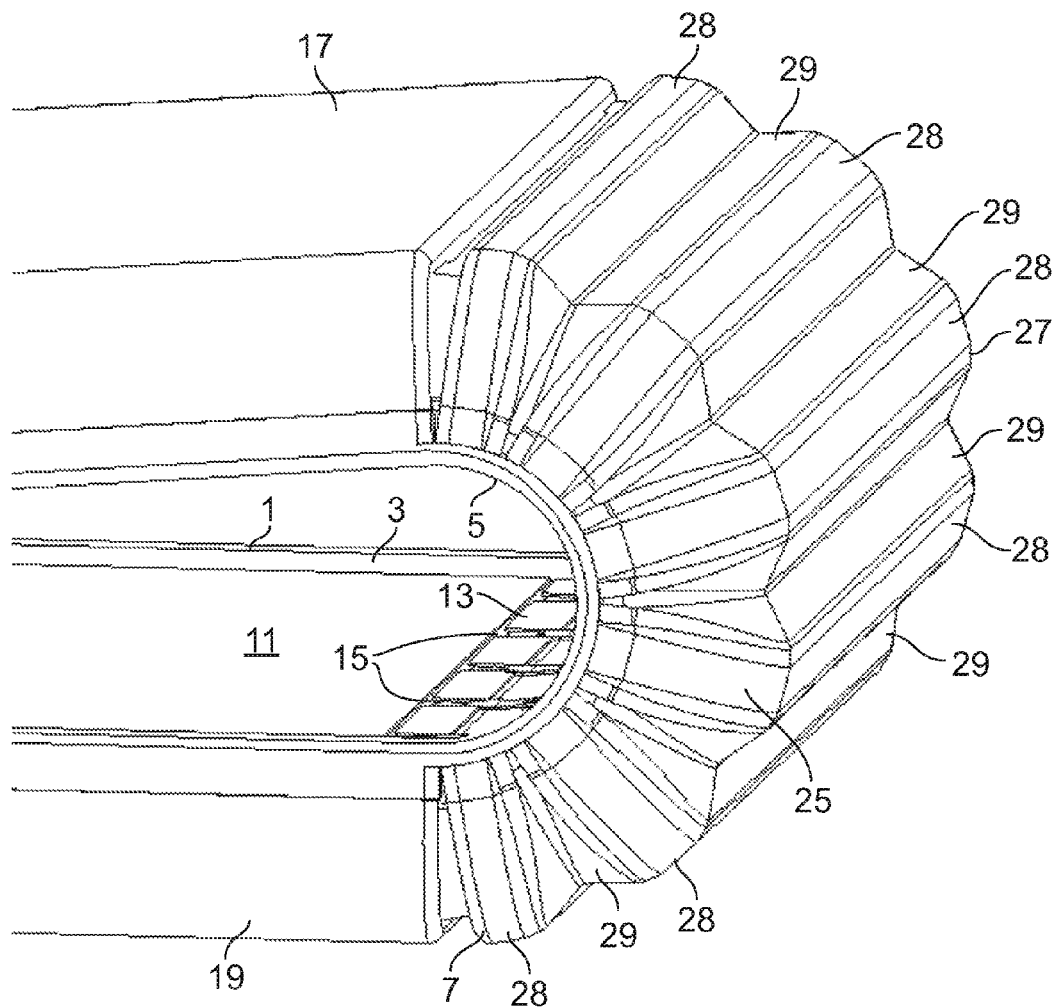

FIGS. 3A to 3C also illustrate an apparatus 1 according to examples of the disclosure. The apparatus 1 may be as described above in relation to FIGS. 1A to 1C and 2A to 2C and so corresponding reference numerals are used for corresponding features.

FIGS. 3A to 3C illustrate a side view of the apparatus 1 as it is moved between open and closed configurations. In the example of FIG. 3A the apparatus 1 is illustrated in an open configuration, in the example of FIG. 3B the apparatus is illustrated in a partially open configuration and in the example of FIG. 3C the apparatus is illustrated in a closed configuration. The open, partially open and closed configurations may be as described above in relation to FIGS. 1A to 1C and 2A to 2C.

The side face 25 of the bendable cover portion 7 is illustrated in FIGS. 3A to 3C. The side faces 25 may cover the sides of the bendable portion 5 of the substrate 3. The rigid cover portions 17, 19 may be arranged to cover the rest of the sides of the substrate 3.

When the apparatus 1 is in the open configuration as illustrated in FIG. 3A the fixed portions 28 of the bendable cover portion 7 may be provided adjacent to each other. The fixed portions 28 may be arranged so that there is no gap or only a small gap between consecutive fixed portions 28.

The fixed portions 28 may be fixed to the rigid members 13 of the substrate 3. When the apparatus 1 is in the open configuration as illustrated in FIG. 3A the rigid members 13 may be arranged so that the sides of adjacent rigid members 13 are parallel to each other.

In FIG. 3B the apparatus 1 is arranged in a partially open configuration. In the configuration of FIG. 3B the rigid members 13 have rotated relative to each other compared to the open configuration. In FIG. 3B the rigid members 13 may be arranged so that the sides of adjacent rigid members 13 are not parallel to each other. In the example of FIG. 3 there is an angle of approximately 16° between the sides of adjacent rigid members 13. It is to be appreciated that in other partially open configurations the angle may be different.

In the partially open configuration the lower portions of the rigid members 13 are spaced from each other so that a gap is provided between lower portions of adjacent rigid members 13. This causes the foldable portions 29 of the bendable cover portion 7 to at least partially unfold.

In FIG. 3C the apparatus 1 is arranged in a closed configuration. In the configuration of FIG. 3C the rigid members 13 have rotated further relative to each other compared to the partially open configuration. In FIG. 3C the rigid members 13 are also arranged so that the sides of adjacent rigid members 13 are not parallel to each other. In the example of FIG. 3C there is an angle of approximately 35° between the sides of adjacent rigid members 13. The angle between the sides of adjacent rigid members 13 may be greater when the apparatus 1 is in the closed configuration that when the apparatus 1 is in an open configuration.

In the closed configuration the lower portions of the rigid members 13 are spaced from each other so that there is a larger gap between lower portions of adjacent rigid members 13 than there was when the apparatus 1 was in the partially open configuration. This causes the foldable portions 29 of the bendable cover portion 7 to unfold further.

In the example of FIGS. 3A to 3C the foldable portions 29 are still partially folded when the apparatus 1 is in the closed configuration. In other examples the foldable portion 29 may be completely unfolded when the apparatus 1 is in the closed configuration.

Figure 4:
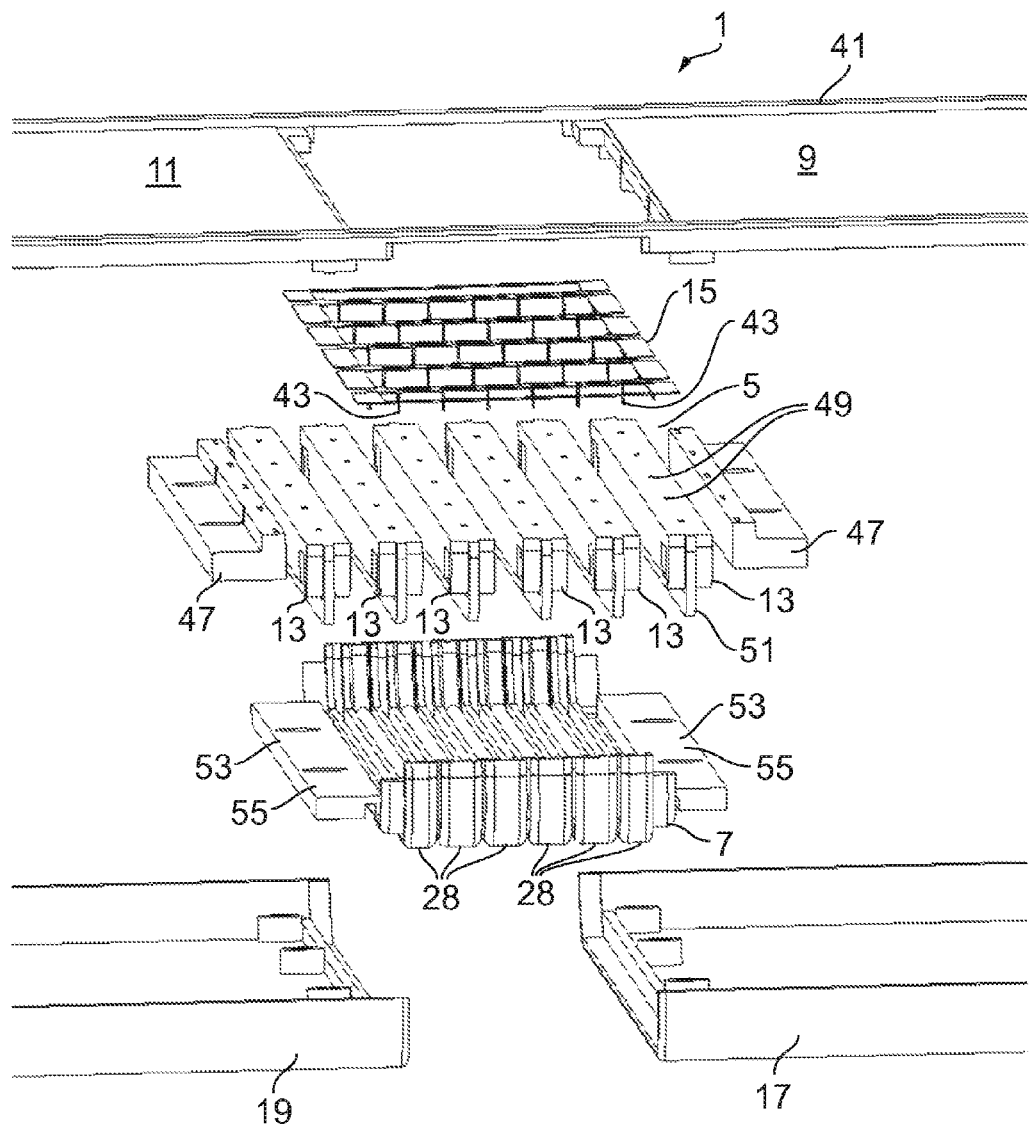
FIG. 4 illustrates an exploded view of components of an apparatus.

FIG. 4 illustrates an exploded view of components of an apparatus 1 according to an example of the disclosure. The apparatus 1 may be an apparatus 1 as described above in relation to any of FIGS. 1A to 3C.

The components comprise a substrate frame 41, linking members 15, a bendable portion 5 comprising a plurality of rigid members 13, a bendable cover portion 7 and rigid cover portions 17, 19.

The substrate frame 41 comprises a first region 9 and a second region 11 as described above. In the example of FIG. 4 the first region 9 and the second region 11 are coupled together.

A plurality of linking members 15 may be provided as described above. The plurality of linking members 15 may be configured to couple the plurality of rigid members 13 together to form the bendable portion 5 of the substrate 3. The plurality of linking members 15 may enable the plurality of rigid members 13 to be coupled together but still allow for movement of the plurality of rigid members 13 in order to enable the substrate 3 to be moved between open and closed configurations.

Each linking member 15 may comprise means for attaching the linking member 15 to the rigid members 13. In the example of FIG. 4 the means for attaching the linking member 15 to the rigid members 13 of the substrate 3 comprises projections 43. In the example of FIG. 4 each linking member 15 is provided with a plurality of projections 43 on the underside of the linking member 15. The projections 43 may be sized and spaced so as to fit into corresponding recesses of the rigid members 13.

The plurality of rigid members 13 may be arranged to move relative to each other to provide a bendable portion 5 of the substrate 3 as described above. In the example of FIG. 4 six rigid members 13 are provided. It is to be appreciated that other numbers of rigid members 13 may be provided in other examples of the disclosure.

In addition to the rigid members 13 coupling members 47 may also be provided. The coupling members 47 may provide means for coupling bendable portion 5 to the substrate frame 41. In the example of FIG. 4 the coupling members 47 may be fixed, for example, by an adhesive to the regions 9, 11 of the substrate 3

Each of the rigid members 13 also comprise means for attaching the linking members 15 to the rigid members 13. In the example of FIG. 4 the means for attaching the linking members 15 to the rigid members 13 comprises a plurality of recesses 49. The recesses 49 may be provided on an upper surface of each of the rigid members 13. The recesses 49 may be sized and spaced so as to receive corresponding projections 43 of the linking members 15.

The rigid portions 13 also comprise means for fixing the bendable cover portion 7 to the rigid members 13. In the example of FIG. 4 the means for fixing the bendable cover portion 7 to the rigid members 13 comprises a plurality of protrusions 51. The protrusions 51 may be provided on a lower surface of each of the rigid members 13. The protrusions 51 may enable the fixed portions 28 of the bendable cover portion 7 to be secured to the rigid members 13 more effectively.

The bendable cover portion 7 may comprise a single piece structure. This may enable the bendable cover portion 7 to effectively protect the substrate from atmospheric conditions such as humidity. The single piece structure may be made of any suitable material such as rubber or another elastomeric material.

The bendable cover portion 7 comprises fixed portions 28 and foldable portions 29. When the apparatus 1 is in the open position the foldable portions 29 are folded between the fixed portions 28 and are not in view.

The fixed portions 28 may be configured to be fixed to the rigid members 13 of the bendable portion 5. The fixed portions 28 may be configured to be fixed to the rigid members 13 of the bendable portion 5 so that the fixed portions 28 do not move relative to the rigid members 13. The fixed portions 28 may be sized and shaped to fit tightly to the lower portions of the rigid members 13.

The bendable cover portion 7 also comprises coupling means 53. The coupling means 53 may enable the bendable cover portion 7 to be coupled to the regions 9, 11 of the substrate 3. In the example of FIG. 4 the coupling means 53 comprise a surface 55 which may be adhered or otherwise fixed to the regions of the coupling members 47 of the bendable portion 5. It is to be appreciated that other means for coupling the bendable cover portion 7 to the substrate 3 may be provided in other examples of the disclosure.

The rigid cover portions 17, 19 may comprise any means which may be arranged to cover the regions 9, 11 of the substrate 3. In some examples the rigid cover portions 17, 19 may be arranged to be releasably attached to the substrate 3. This may enable a user to be able to remove the rigid cover portions 17, 19.

FIGS. 5A to 5H illustrate examples of how the components of FIG. 4 may be assembled to provide an apparatus 1.

Figure 5A:
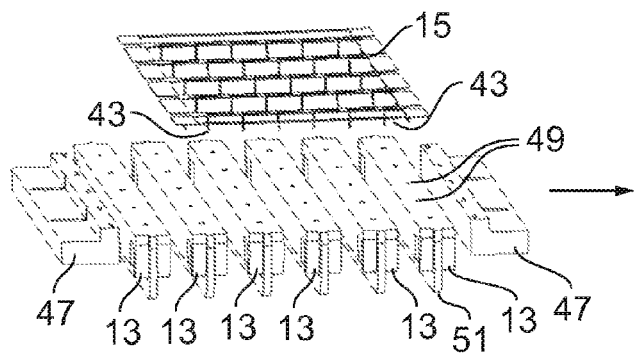
FIGS. 5A to 5H illustrate examples of how the components of FIG. 4 may be assembled to provide an apparatus.

FIG. 5A shows the rigid members 13 and the linking members 15. The rigid members 13 and the linking members 15 may be as described above in relation to FIG. 4.

Figure 5B:
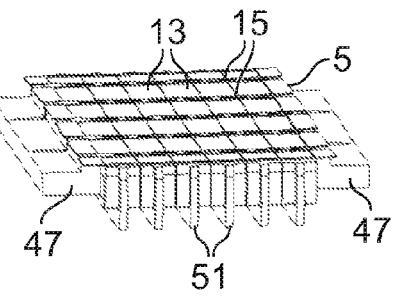

In FIG. 5B the rigid members 13 and the linking members 15 are coupled together to form the bendable portion 5. The rigid members 13 and the linking members 15 may be coupled together by arranging the rigid members 13 and the linking members 15 so that the projections 43 on the underside of the linking member 15 are inserted into the corresponding recesses of the rigid members 13.

Figure 5D:
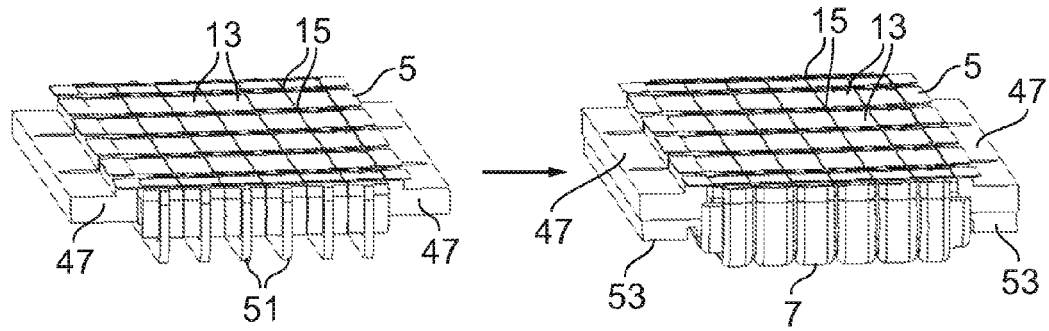
Figure 5C:
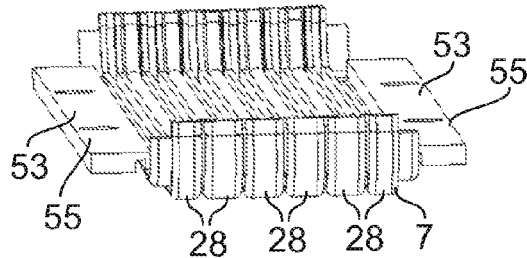

FIG. 5C shows the assembled bendable portion 5 and the bendable cover portion 7. In FIG. 5D the bendable portion 5 and the bendable cover portion 7 are coupled together. The bendable portion 5 and the bendable cover portion 7 may be coupled together by adhering the fixed portions 28 of the bendable cover portion 7 to the protrusions 51 on the lower portion of the rigid members 13.

Figure 5E:
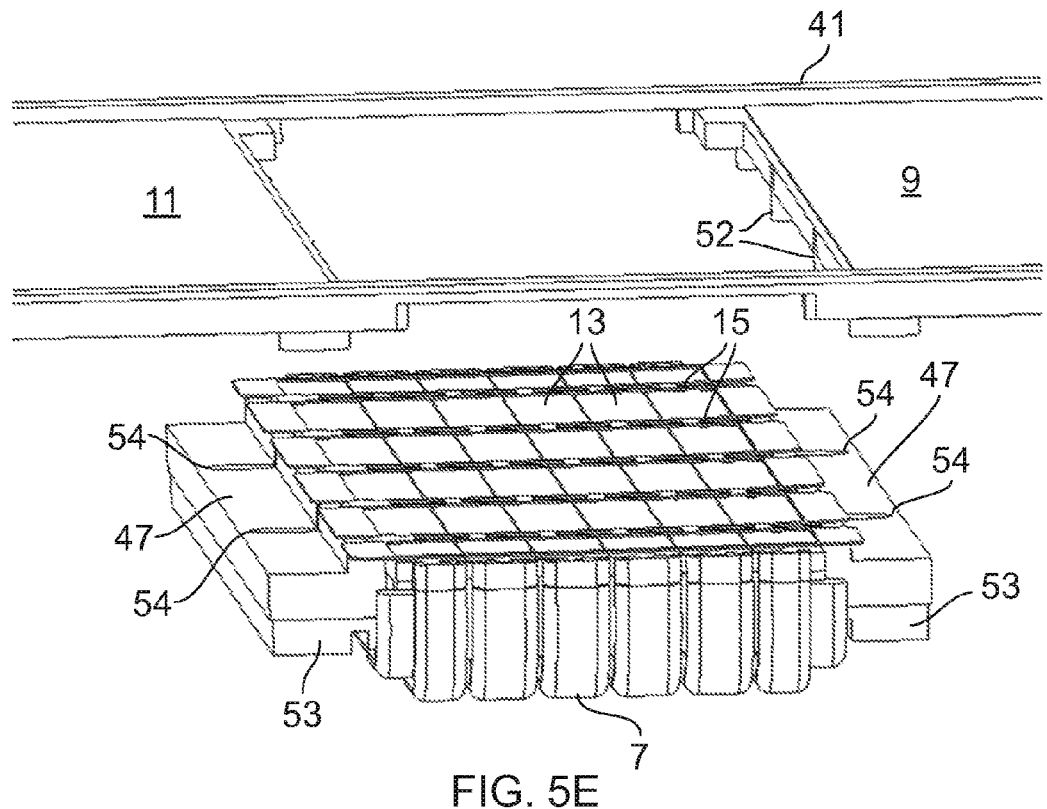
Figure 5F:
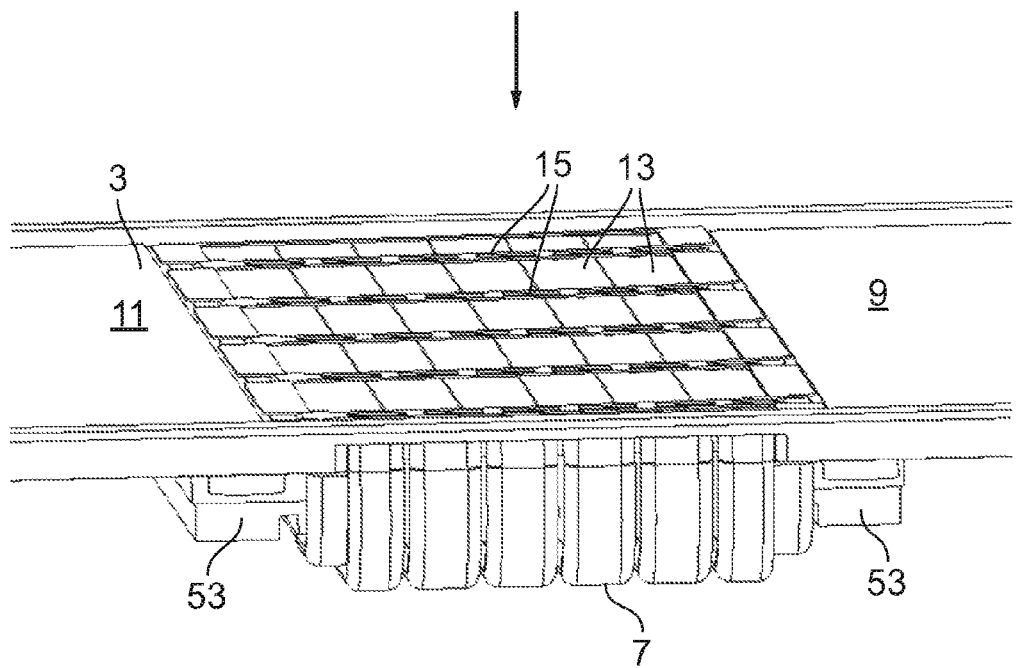

In FIG. 5E the bendable portion 5 and the bendable cover portion 7 are shown with the substrate frame 41. In FIG. 5F the bendable portion 5 and the bendable cover portion 7 are coupled to the substrate frame 41 to provide the substrate 3. The bendable portion 5 and the bendable cover portion 7 may be coupled to the substrate frame 41 using any suitable means. In the example of FIG. 5F the regions 9, 11 of the substrate 3 may comprise projections 52 which may be configured to be received by corresponding recesses 54 in the bendable portion 5.

Figure 5G:
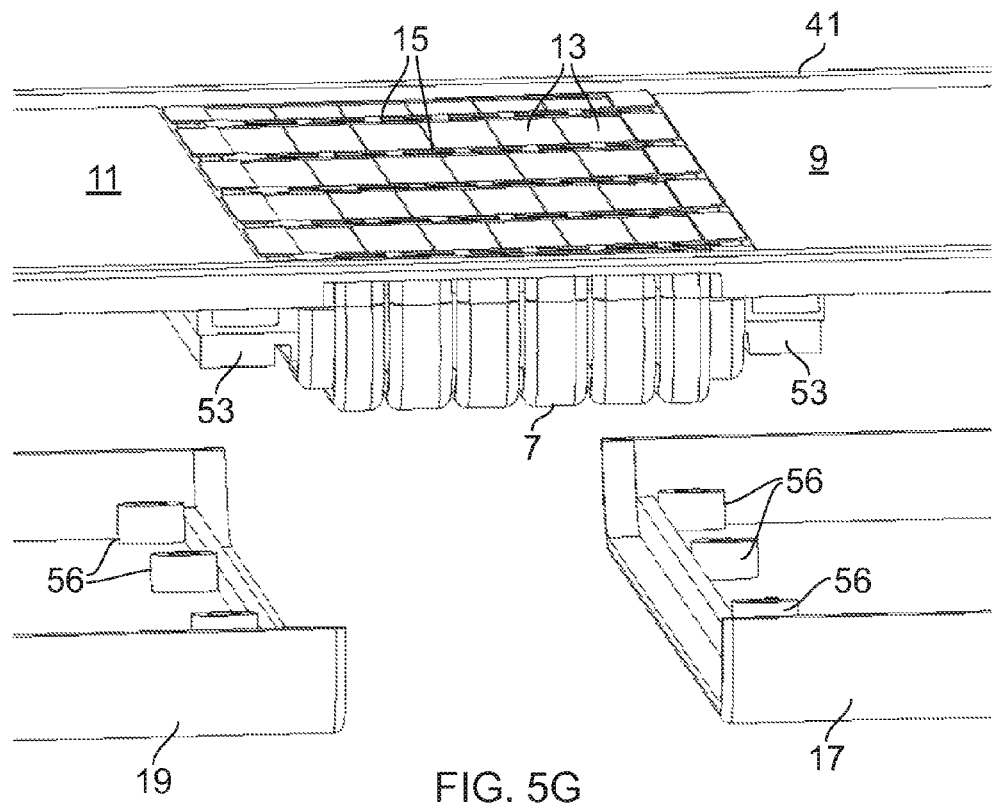
Figure 5H:
Figure 5H:
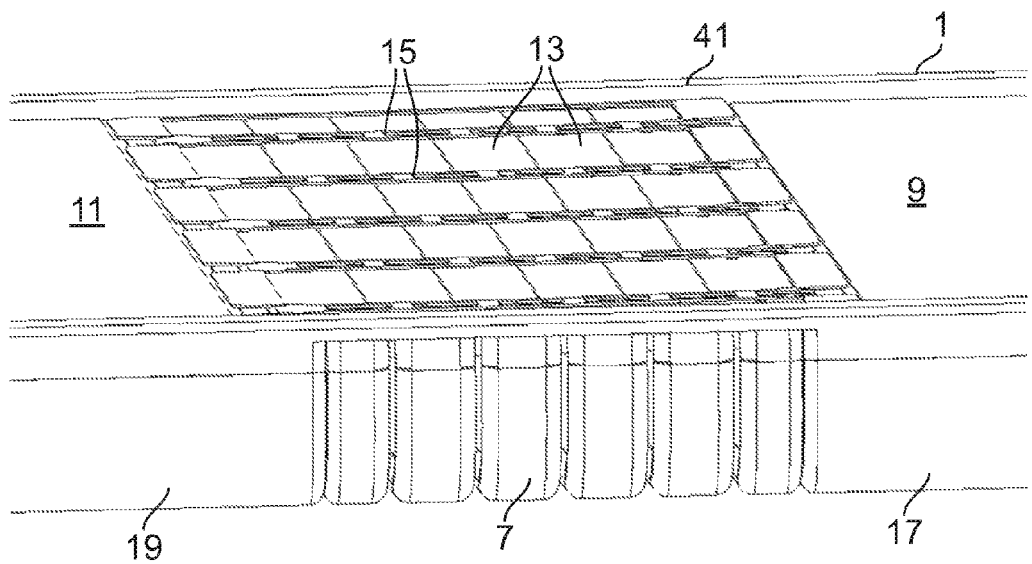

FIG. 5G shows the substrate 3 and the rigid cover portions 17, 19. In FIG. 5H the rigid cover portions 17, 19 are coupled to the substrate 3 to form the apparatus 1. The rigid cover portions 17, 19 may be coupled to the substrate 3 using any suitable means. In the example of FIG. 5H the rigid cover portions 17, 19 may comprise projections 56 which may be configured to be received by corresponding recesses in the coupling means 53 of the bendable cover portion 7. The rigid cover portions 17, 19 may be releasably attached to the substrate 3. This may enable a user to remove the rigid cover portions 17, 19.

Figure 6:
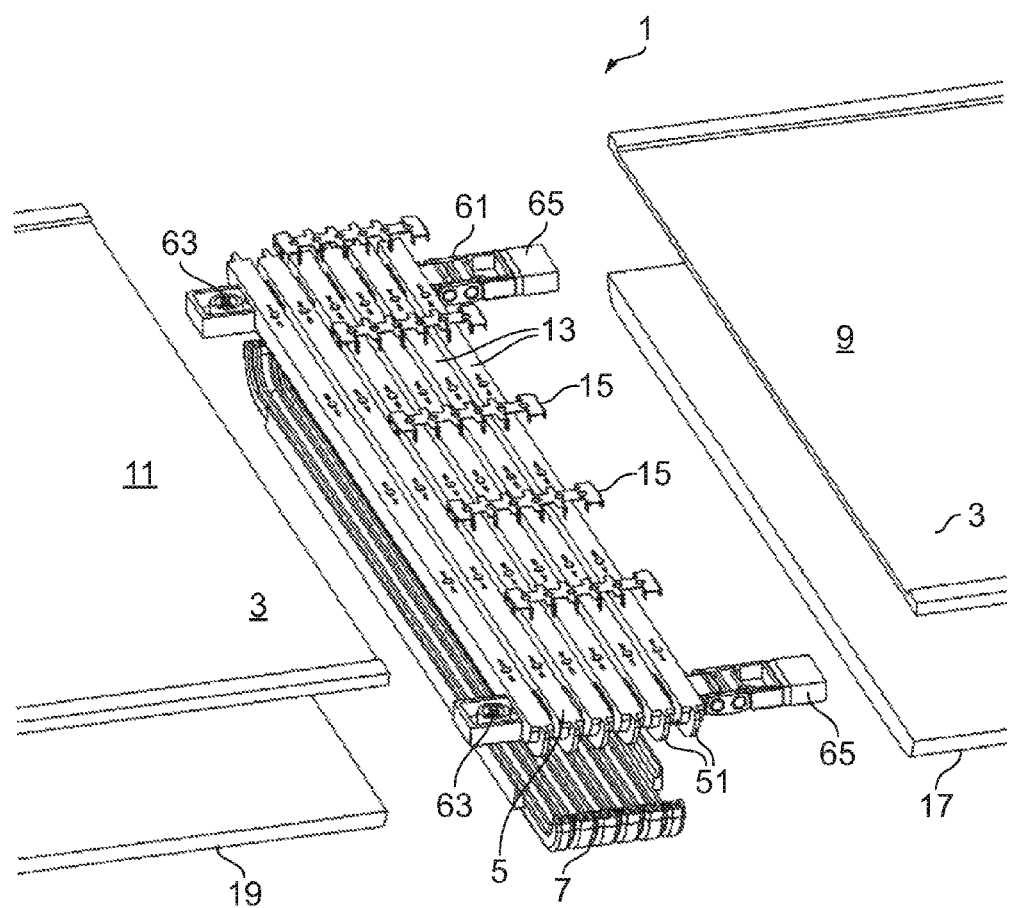
FIG. 6 illustrates an exploded view of components of another apparatus.

FIG. 6 illustrates an exploded view of components of another apparatus 1 according to an example of the disclosure.

The apparatus 1 of FIG. 6 is similar to the apparatus of FIGS. 1A to 5G in that it comprises a substrate 3 comprising at least one bendable portion 5 where the bendable portion 5 comprises a plurality of rigid members 13 and a bendable cover portion 7 provided to cover at least some of the bendable portion 5. Corresponding reference numerals are used for corresponding features.

The apparatus of FIG. 6 also comprises a support structure 61. The support structure 61 may be provided within the bendable portion 5 of the substrate 3. In the particular example of FIG. 6 the support structure 61 may be inserted through a plurality of holes in the plurality of rigid members 13.

In the example of FIG. 6 two support structures 61 are provided. The support structures 61 are provided on either side of the bendable portion 5.

The support structure 61 may be configured to restrict movement of the substrate 3. In the examples of FIG. 6 the support structure 61 comprises a plurality of frictional components where the frictional components are configured to oppose movement of the substrate 3. This may enable the apparatus 1 to be arranged in a partially open configuration and/or may prevent the substrate 3 from being bent too much in the closed configuration.

The support structure 61 may also comprise means for coupling the support structure 61 to the substrate 3. In the example of FIG. 6 the means comprises a screw 63. The screw 63 may be fixed into the substrate to hold the support structure 61 in position relative to the substrate 3. It is to be appreciated that other means of fixing the support structure 61 to a substrate 3 may be used in other examples of the disclosure.

In the example of FIG. 6 the support structure 61 also comprises a locking mechanism 65. The locking mechanism 65 may be configured to hold regions 9, 11 of the substrate 3 in position relative to each other. The locking mechanism 65 may be configured to lock the apparatus 1 in the open configuration. In the example of FIG. 6 the locking mechanism 65 comprises a magnetic locking mechanism.

In some examples the locking mechanism 65 may comprise mechanisms configured to hold the apparatus 1 in a partially open configuration and/or in an open configuration. Such examples may comprise a magnet coupled to a moving end of a chain. A static magnet may be provided close to the chain and configured so that a shear force is provided when the moving magnet slides close to the static magnet. The shear force may provide a locking feeling to a user.

Figure 7A:
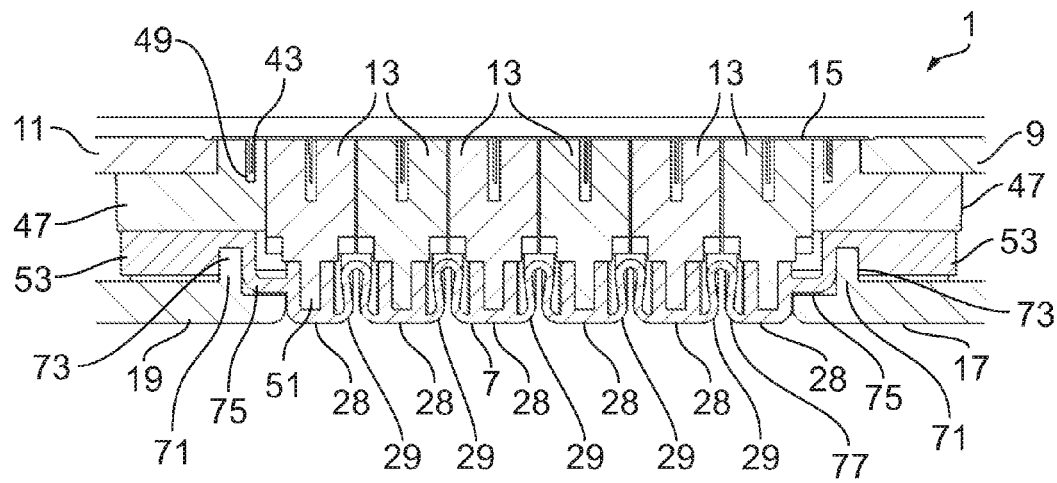
FIGS. 7A to 7C illustrate a cross section through components of an example apparatus.
Figure 7B:
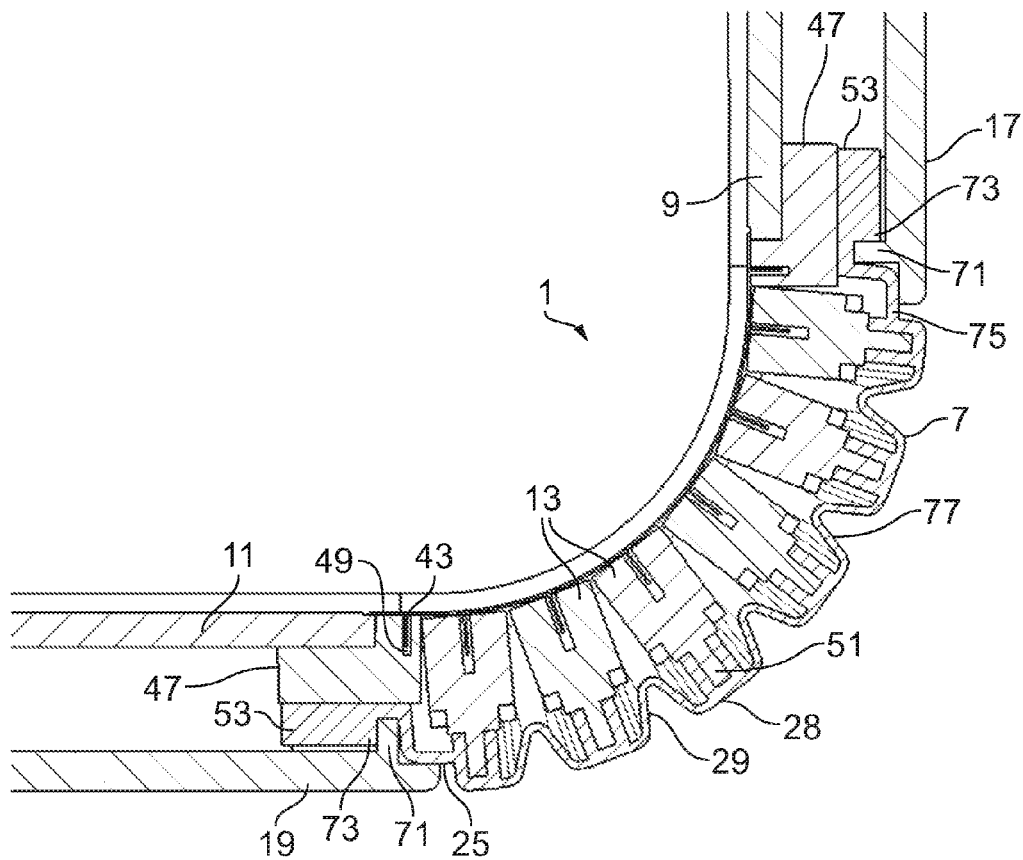
Figure 7C:
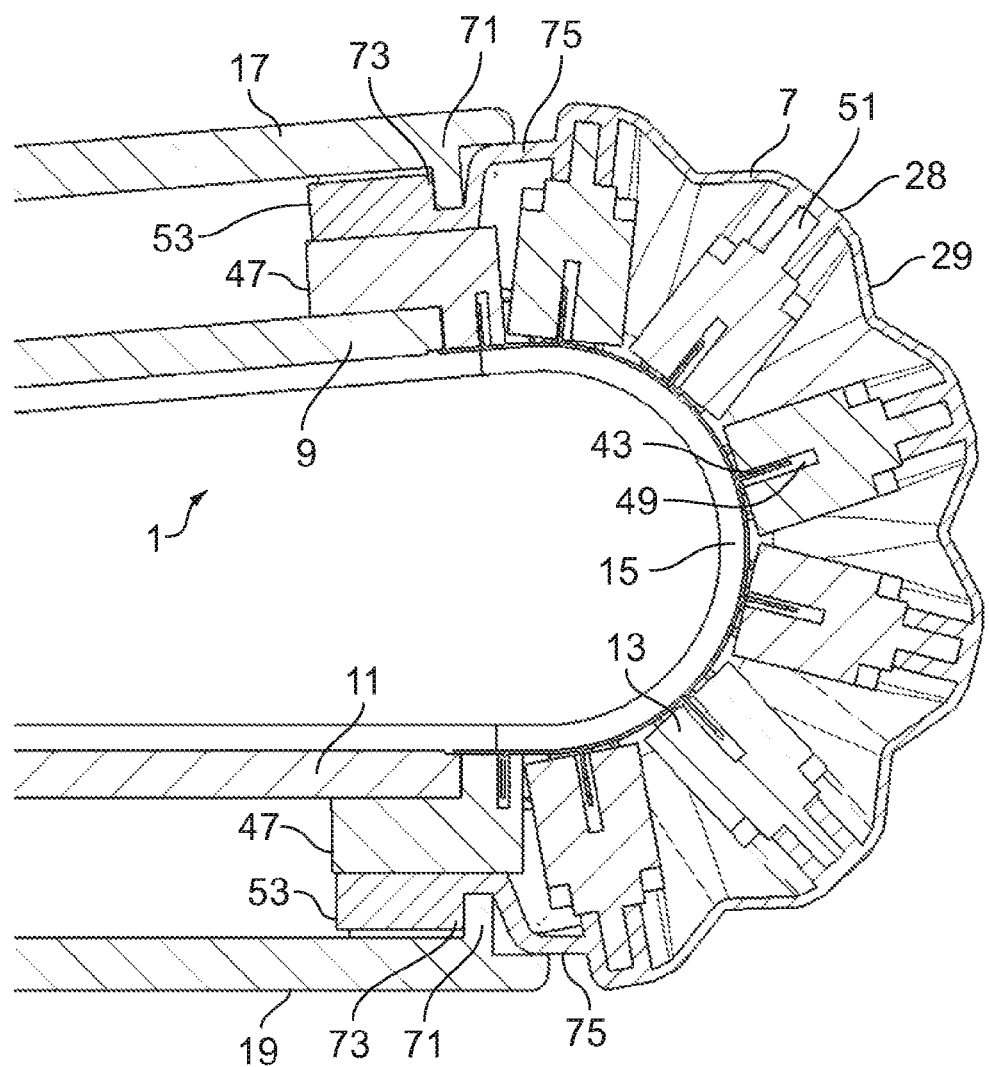

FIGS. 7A to 7C illustrate a cross section through components of an example apparatus 1. The apparatus 1 may be as described above in relation to any of FIGS. 1A to 6. Corresponding reference numerals are used for corresponding features.

FIGS. 7A to 7C illustrate a cross section of the apparatus 1 as it is moved between the open and closed configurations. In the example of FIG. 7A the apparatus 1 is illustrated in an open configuration, in the example of FIG. 7B the apparatus 1 is illustrated in a partially open configuration and in the example of FIG. 7C the apparatus 1 is illustrated in a closed configuration. The open, partially open and closed configurations may be as described above in relation to FIGS. 1A to 1C, FIGS. 2A to 2C and FIGS. 3A to 3C.

The cross section of FIG. 7A shows how the rigid members 13 are arranged in the open configuration. The upper portions of the rigid members 13 are arranged so that there is no gap or only a small gap between adjacent rigid members 13. The lower portions of the rigid members 13 comprise protrusions 51. The protrusions 51 are narrower than upper portions of the rigid members 13. This creates a plurality of gaps 77 between the lower portions of the rigid members 13 even when the bendable portion 5 is in the open position. The foldable portions 29 of the bendable cover portion 7 may be folded into the gaps when the apparatus 1 is in the open position.

The fixed portions 28 of the bendable cover portion 7 may be fixed to the protrusions 51. The protrusions 51 may be shaped to provide a larger contact surface area between the fixed portions 28 of the bendable cover portion 7 and the rigid members 13. This may enable the bendable cover portion 7 to be fixed to the rigid members 13 more efficiently.

The coupling means 53 of the bendable cover portion 7 may comprise a portion which is fixed to the coupling member 47 of the bendable portion. In some examples the coupling means 53 may be adhered to the coupling member 47 of the bendable portion.

In the examples of FIGS. 7A to 7C the coupling means 53 also comprises an L-shaped portion 75. The L-shaped portion 75 is separated from the rest of the coupling means 53 by an indent 73. The indent is configured to receive a projection 71 of the rigid cover portion 17, 19.

In FIG. 7B the apparatus 1 is arranged in a partially open configuration. In the partially open configuration of FIG. 7B the rigid members 13 have rotated relative to each other compared to the open configuration. In FIG. 7B the rigid members 13 are now arranged so that there is a gap provided between the upper portions of the rigid members 13 and the gaps 77 between the lower portions of the rigid members 13 has increased. The relative movement of the rigid members 17 has caused the foldable portions 29 of the bendable cover portion 7 to at least partially unfold.

The relative movement of the rigid members 13 may also cause movement of the L-shaped portion 75. In the example of FIG. 7B the L-shaped portion has been rotated so that the angle between the two arms of the L-shaped portion 75 is slightly greater than 90°.

In FIG. 7C the apparatus 1 is arranged in a closed configuration. In the configuration of FIG. 7C the rigid members 13 have rotated further relative to each other compared to the partially open configuration. In FIG. 7C the rigid members 13 are now arranged so that the gaps 77 between the lower portions of the rigid members 13 have increased further. This has caused the foldable portions 29 of the bendable cover portion 7 to unfold further.

In the example of FIGS. 7A to 7C the foldable portion is still partially folded when the apparatus 1 is in the closed configuration. In other examples the foldable portion 29 may be completely unfolded when the apparatus is in the closed configuration.

The relative movement of the rigid members 13 has also caused further movement of the L-shaped portion 75. In the example of FIG. 7C the L-shaped portion has been rotated so that the angle between the two arms of the L-shaped portion 75 is much greater than 90°.

The deformation of the L-shaped portion 75 as the bendable cover portion 7 was the apparatus is moved into the closed configuration helps to prevent the coupling means 53 from being detached from the substrate 3. As the L-shaped portion 75 deforms this reduces the amount of strain forces that the coupling means 53 is subject to.

Figure 8:
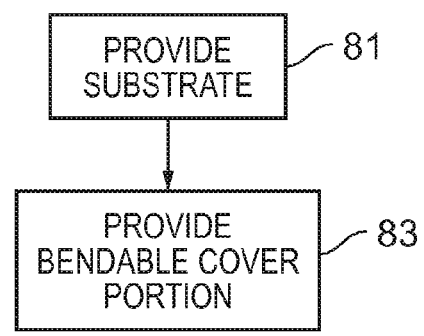
FIG. 8 illustrates a method.

FIG. 8 illustrates a method according to an example of the disclosure.

The method comprises, as block 81, providing a substrate 3. The substrate may be configured to support a flexible display. The substrate 3 may comprise at least one bendable portion 5 configured to enable the substrate 3 to be moved between an open configuration and a closed configuration. The at least one bendable portion 5 may comprise a plurality of rigid members 13. The substrate 3 may be as described above in relation to any of FIGS. 1A to 7C.

The method may also comprise, at block 83, providing a bendable cover portion 7. The bendable cover portion 7 may be configured to cover at least the bendable portion 5 of the substrate 3. The bendable cover portion 7 may comprise a plurality of foldable portions 29 configured to be folded between the rigid members 13 such that the foldable portions 29 enable the bendable cover portion 7 to be moved between an open configuration and a closed configuration.

Examples of the apparatus 1 and method described above provide for a bendable apparatus 1 which has a bendable portion 5 which is arranged to allow the apparatus 1 to be easily moved between the open and the closed configurations but prevent further deformation of the apparatus 1. This may protect components such as a flexible display 5 and other sensitive electronic components mounted on the substrate 3 from damage.

The structure of the bendable portion 5 is simple yet it provides a strong and rigid structure both in the closed and open configuration. The user can easily move the apparatus 1 between the open and closed configurations.

The bendable cover portion 7 provides a structure which can be simply manufactured and attached to the substrate 3 to protect the components of the bendable apparatus 1.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
    a substrate wherein the substrate is configured to support a flexible display and the substrate comprises at least one bendable portion configured to enable the substrate to be moved between an open configuration and a closed configuration and wherein the at least one bendable portion comprises a plurality of rigid members; and
    a bendable cover portion comprising a plurality of fixed portions configured to be fixed to the plurality of rigid members, the plurality of rigid members comprising projections configured to enable the plurality of fixed portions of the bendable cover portion to be fixed to the plurality of rigid members of the substrate, wherein the bendable cover portion is configured to cover at least the at least one bendable portion of the substrate wherein the bendable cover portion comprises a plurality of foldable portions configured to be folded between the plurality of rigid members such that the plurality of foldable portions enable the bendable cover portion to be moved between the open configuration and the closed configuration.

2. An apparatus as claimed in claim 1, wherein the plurality of foldable portions are provided between the plurality of fixed portions.

3. An apparatus as claimed in claim 1, wherein the plurality of foldable portions are configured to, at least partially, unfold as the apparatus is moved from the open configuration to the closed configuration.

4. An apparatus as claimed in claim 1, wherein the bendable cover portion is fixed to the substrate using an adhesive.

5. An apparatus as claimed in claim 1, wherein the plurality of rigid members extend horizontally across the apparatus.

6. An apparatus as claimed in claim 1, wherein the plurality of rigid members are coupled together by at least one linking member.

7. An apparatus as claimed in claim 1, wherein the flexible display is continuous across the at least one bendable portion.

8. An apparatus as claimed in claim 1, wherein the apparatus is configured so that when the apparatus is in the closed configuration a first portion of the flexible display and a second portion of the flexible display are configured facing each other.

9. An apparatus as claimed in claim 1, wherein the bendable cover portion forms at least part of the external casing of the apparatus.

10. An apparatus as claimed in claim 1, wherein the bendable cover portion is configured to protect electronic components within the apparatus.

11. An apparatus as claimed in claim 1, wherein the substrate comprises rigid portions and the apparatus comprises rigid cover portions configured to cover at least part of the plurality of rigid members of the substrate.

12. An apparatus as claimed in claim 1, wherein the bendable cover portion comprises a rear face configured to cover at least a portion of a rear face of the substrate and the bendable cover portion also comprises at least one side face configured to cover at least one side face of the substrate.

13. A bendable cover portion comprising a plurality of fixed portions configured to be fixed to rigid members of an apparatus, the rigid members comprising projections configured to enable the plurality of fixed portions of the bendable cover portion to be fixed to the rigid members, wherein the bendable cover portion is configured to cover at least a bendable portion of the apparatus wherein the bendable cover portion comprises a plurality of foldable portions configured to be folded between rigid members of the apparatus such that the foldable portions enable the bendable cover portion to be moved between an open configuration and a closed configuration.

14. A bendable cover portion as claimed in claim 13, wherein the plurality of foldable portions are configured to be provided between the plurality of fixed portions.

15. A bendable cover portion as claimed in claim 13, wherein the plurality of foldable portions are configured to, at least partially, unfold as the bendable cover portion is moved from the open configuration to the closed configuration.

16. A method comprising:
    providing a substrate wherein the substrate is configured to support a flexible display and the substrate comprises at least one bendable portion configured to enable the substrate to be moved between an open configuration and a closed configuration and wherein the at least one bendable portion comprises a plurality of rigid members; and
    providing a bendable cover portion comprising a plurality of fixed portions configured to be fixed to the plurality of rigid members, the plurality of rigid members comprising projections configured to enable the plurality of fixed portions of the bendable cover portion to be fixed to the plurality of rigid members of the substrate, wherein the bendable cover portion is configured to cover at least the bendable portion of the substrate wherein the bendable cover portion comprises a plurality of foldable portions configured to be folded between the plurality of rigid members such that the foldable portions enable the bendable cover portion to be moved between the open configuration and the closed configuration.

17. A method as claimed in claim 16, further comprising providing the plurality of foldable portions between the plurality of fixed portions.

* * * * *